(12) United States Patent
Sekharan

(10) Patent No.: US 11,397,770 B2
(45) Date of Patent: Jul. 26, 2022

(54) QUERY DISCOVERY AND INTERPRETATION

(71) Applicant: SAP SE, Walldorf (DE)

(72) Inventor: Satishkumar Sekharan, Coquitlam (CA)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 16/200,152

(22) Filed: Nov. 26, 2018

(65) Prior Publication Data

US 2020/0167432 A1     May 28, 2020

(51) Int. Cl.
*G06F 16/9032* (2019.01)
*G06F 40/205* (2020.01)
*G06F 16/33* (2019.01)
*G06F 16/9038* (2019.01)

(52) U.S. Cl.
CPC .... *G06F 16/90328* (2019.01); *G06F 16/3344* (2019.01); *G06F 16/9038* (2019.01); *G06F 40/205* (2020.01)

(58) Field of Classification Search
CPC ............. G06F 16/90328; G06F 40/205; G06F 16/3344; G06F 16/9338; G06F 16/2428; G06F 16/9038
USPC ........................................................ 707/736
See application file for complete search history.

(56) References Cited

U.S. PATENT DOCUMENTS

| | | | | |
|---|---|---|---|---|
| 6,081,774 A * | 6/2000 | de Hita | ............... | G06F 16/3338 704/9 |
| 6,959,425 B1 * | 10/2005 | Krauklis | ................ | G06F 9/451 715/864 |
| 6,999,963 B1 * | 2/2006 | McConnell | ........... | G06F 16/353 |
| 7,685,116 B2 * | 3/2010 | Pell | ......................... | G06F 3/038 707/999.004 |
| 8,577,913 B1 * | 11/2013 | Hansson | ................ | G06F 3/048 707/767 |
| 9,116,918 B1 * | 8/2015 | Kim | ..................... | H04N 21/278 |
| 9,529,936 B1 * | 12/2016 | Pankaj | ................ | G06F 16/3322 |
| 10,198,511 B1 * | 2/2019 | Gupta | ................... | G06F 16/951 |
| 10,515,625 B1 * | 12/2019 | Metallinou | ............. | G10L 15/26 |
| 10,686,736 B1 * | 6/2020 | Jiang | .................. | G06F 16/3344 |
| 10,846,318 B1 * | 11/2020 | McNabney | ........... | G06F 16/338 |
| 10,955,255 B2 * | 3/2021 | Yang | ..................... | G06N 20/00 |
| 11,016,964 B1 * | 5/2021 | Hinegardner | ....... | G06F 16/2428 |
| 2003/0233224 A1 * | 12/2003 | Marchisio | .............. | G06F 40/35 704/4 |
| 2004/0119732 A1 * | 6/2004 | Grossman | ............. | G06Q 10/10 715/708 |
| 2004/0210844 A1 * | 10/2004 | Pettinati | ................ | G06Q 10/10 715/708 |

(Continued)

OTHER PUBLICATIONS

Meschkat, Steffen, "Disambiguation of entity references in natural language interpretation", Technical Disclosure Commons, Mar. 26, 2018, 7 pages. (Year: 2018).*

*Primary Examiner* — Phuong Thao Cao

(74) *Attorney, Agent, or Firm* — Buckley, Maschoff & Talwalkar LLC

(57) ABSTRACT

A system includes reception of a token input by a user into a user interface, determination, in response to reception of the token, of a query entity associated with the token, the query entity associated with an entity type, and display of a graphical indicator on the user interface in association with the token, the graphical indicator indicating the determined entity type.

20 Claims, 17 Drawing Sheets

(56) References Cited

U.S. PATENT DOCUMENTS

| | | | | |
|---|---|---|---|---|
| 2005/0108024 A1* | 5/2005 | Fawcett | G06Q 10/063 | 705/14.4 |
| 2006/0247915 A1* | 11/2006 | Bradford | H04M 1/72454 | 704/1 |
| 2006/0294192 A1* | 12/2006 | Mao | H04L 63/102 | 709/213 |
| 2007/0061703 A1* | 3/2007 | Kambhatla | G06F 40/117 | 715/234 |
| 2008/0059898 A1* | 3/2008 | Deggelmann | G06F 3/048 | 715/764 |
| 2009/0019356 A1* | 1/2009 | Deyab | G06F 40/169 | 715/231 |
| 2009/0249198 A1* | 10/2009 | Davis | G06F 40/284 | 715/261 |
| 2010/0094854 A1* | 4/2010 | Rouhani-Kalleh | G06F 16/3325 | 707/706 |
| 2010/0131869 A1* | 5/2010 | Adachi | G06F 8/34 | 715/760 |
| 2010/0205121 A1* | 8/2010 | Quadracci | G06Q 10/06 | 707/E17.014 |
| 2010/0205198 A1* | 8/2010 | Mishne | G06F 16/3346 | 707/759 |
| 2011/0270888 A1* | 11/2011 | Crochet | G06F 40/194 | 707/794 |
| 2011/0307504 A1* | 12/2011 | Agrawal | G06F 16/90328 | 707/766 |
| 2012/0036145 A1* | 2/2012 | Tunstall-Pedoe | G06F 16/24534 | 707/760 |
| 2012/0259829 A1* | 10/2012 | Zhou | G06F 16/24534 | 707/706 |
| 2012/0303664 A1* | 11/2012 | Apacible | G06F 16/951 | 707/780 |
| 2013/0173639 A1* | 7/2013 | Chandra | G06F 16/951 | 707/754 |
| 2013/0218861 A1* | 8/2013 | Hong | G06F 16/288 | 707/706 |
| 2013/0226892 A1* | 8/2013 | Ehsani | G06F 16/951 | 707/706 |
| 2014/0040274 A1* | 2/2014 | Aravamudan | G06F 16/3322 | 707/741 |
| 2014/0172840 A1* | 6/2014 | Kumar | G06F 16/9535 | 707/723 |
| 2014/0244637 A1* | 8/2014 | O'Donnell | G06F 16/245 | 707/736 |
| 2014/0279078 A1* | 9/2014 | Nukala | G06Q 30/0276 | 705/14.73 |
| 2014/0279994 A1* | 9/2014 | Gulli | G06F 16/3325 | 707/706 |
| 2014/0282136 A1* | 9/2014 | Marantz | G06Q 30/0269 | 715/764 |
| 2015/0026145 A1* | 1/2015 | Prakash | G06F 16/951 | 707/723 |
| 2015/0039580 A1* | 2/2015 | Subhedar | G06Q 10/02 | 707/706 |
| 2015/0052115 A1* | 2/2015 | Sharifi | G06F 16/24578 | 707/722 |
| 2015/0074747 A1* | 3/2015 | Philip | G06F 21/64 | 726/1 |
| 2015/0156061 A1* | 6/2015 | Saxena | G06F 17/30864 | 715/733 |
| 2015/0205858 A1* | 7/2015 | Xie | G06F 16/9535 | 707/755 |
| 2015/0212714 A1* | 7/2015 | Hua | G06F 8/34 | 715/739 |
| 2015/0269153 A1* | 9/2015 | Fink | G06F 40/30 | 707/750 |
| 2015/0269175 A1* | 9/2015 | Espenshade | G06F 16/90324 | 706/47 |
| 2015/0269176 A1* | 9/2015 | Marantz | G06F 16/90324 | 707/767 |
| 2015/0310491 A1* | 10/2015 | Kraft | G06Q 30/0263 | 705/14.6 |
| 2015/0317354 A1* | 11/2015 | Andress | G06F 16/951 | 707/706 |
| 2015/0324425 A1* | 11/2015 | Behzadi | G06F 16/9537 | 707/759 |
| 2015/0347433 A1* | 12/2015 | Bhagwan | G16H 10/60 | 707/749 |
| 2016/0077708 A1* | 3/2016 | Han | G06F 3/04817 | 715/846 |
| 2016/0092506 A1* | 3/2016 | Liu | G06F 16/2453 | 707/767 |
| 2016/0094889 A1* | 3/2016 | Venkataraman | G06F 16/24575 | 725/53 |
| 2016/0179953 A1* | 6/2016 | Klotz, Jr | G06F 16/2455 | 707/722 |
| 2016/0196360 A1* | 7/2016 | Best | G06F 16/24522 | 707/722 |
| 2016/0224621 A1* | 8/2016 | Bousquet | G06F 16/9535 | |
| 2016/0275148 A1* | 9/2016 | Jiang | G06F 16/24522 | |
| 2016/0335787 A1* | 11/2016 | Martin | G06F 3/04845 | |
| 2017/0011068 A1* | 1/2017 | Vashishtha | G06F 16/5866 | |
| 2017/0017696 A1* | 1/2017 | Alonso | G06F 40/169 | |
| 2017/0039209 A1* | 2/2017 | Gupta | G06F 16/90324 | |
| 2017/0097936 A1* | 4/2017 | Glover | G06F 16/2425 | |
| 2017/0161262 A1* | 6/2017 | Bhatt | G06F 40/279 | |
| 2017/0168695 A1* | 6/2017 | Francis | G06F 16/3331 | |
| 2017/0199943 A1* | 7/2017 | Steelberg | G06F 16/9032 | |
| 2017/0206683 A1* | 7/2017 | Beckett | G06F 16/248 | |
| 2017/0220687 A1* | 8/2017 | Hawking | G06F 16/9535 | |
| 2017/0242913 A1* | 8/2017 | Tijssen | G06F 40/247 | |
| 2017/0278514 A1* | 9/2017 | Mathias | G10L 15/22 | |
| 2017/0337202 A1* | 11/2017 | Arya | G06N 20/00 | |
| 2017/0364503 A1* | 12/2017 | Anisimovich | G06F 40/30 | |
| 2017/0372190 A1* | 12/2017 | Bishop | G06F 40/295 | |
| 2018/0018315 A1* | 1/2018 | Takei | G06F 40/109 | |
| 2018/0032503 A1* | 2/2018 | Swart | G06F 16/219 | |
| 2018/0039406 A1* | 2/2018 | Kong | G06F 16/951 | |
| 2018/0121480 A1* | 5/2018 | Jaikumar | G06F 16/245 | |
| 2018/0137124 A1* | 5/2018 | Konigsberg | G06F 16/24522 | |
| 2018/0336272 A1* | 11/2018 | Garcia Santa | G06N 20/00 | |
| 2019/0005044 A1* | 1/2019 | Bell | G06F 16/285 | |
| 2019/0012060 A1* | 1/2019 | Moore | G06F 3/017 | |
| 2019/0018849 A1* | 1/2019 | Dong | G06F 16/9535 | |
| 2019/0018884 A1* | 1/2019 | Wakankar | G06Q 10/1053 | |
| 2019/0034407 A1* | 1/2019 | Hagiwara | G06K 9/6218 | |
| 2019/0129688 A1* | 5/2019 | Yao | G10L 15/22 | |
| 2019/0258963 A1* | 8/2019 | Guo | G06N 20/00 | |
| 2019/0272296 A1* | 9/2019 | Prakash | G06F 16/243 | |
| 2019/0340281 A1* | 11/2019 | Maiti | G06F 9/45558 | |
| 2019/0377789 A1* | 12/2019 | Jegannathan | G06F 40/268 | |
| 2020/0090033 A1* | 3/2020 | Ramachandran | G06N 3/08 | |
| 2020/0234008 A1* | 7/2020 | Song | G06F 3/04817 | |

* cited by examiner

Natural Language Query

Most-used Entities

[Order Quantity] [Sales] [Profit] [Shipping Cost] [Customer Name] [Customer Segment] [Product Name]
[Product Category] [Product Sub Category] [Order Date] [Order Priority] [Ship Date] [Ship Mode] [Region]

Did you mean
furniture order quantity by region                                       840

🔍 chart

| order_quantity | product_category | region |
|---|---|---|
| 6066 | Furniture | Atlantic |
| 2066 | Furniture | Yukon |
| 368 | Furniture | Nunavut |
| 8318 | Furniture | Prarie |
| 10497 | Furniture | Quebec |
| 2601 | Furniture | West |

*FIG. 8C*

Natural Language Query

Most-used Entities

[Order Quantity] [Sales] [Profit] [Shipping Cost] [Customer Name] [Customer Segment] [Product Name]
[Product Category] [Product Sub Category] [Order Date] [Order Priority] [Ship Date] [Ship Mode] [Region]

Did you mean
furniture order quantity by region chart                                  840

🔍

(bar chart: order_quantity by region) — 850

Natural Language Query

Most-used Entities

Order Quantity | Sales | Profit | Shipping Cost | Customer Name | Customer Segment | Product Name
Product Category | Product Sub Category | Order Date | Order Priority | Ship Date | Ship Mode | Region Did you mean sales per category [multi-match]
            product category ✓
            product sub category ✗

Natural Language Query

Most-used Entities

Order Quantity | Sales | Profit | Shipping Cost | Customer Name | Customer Segment | Product Name
Product Category | Product Sub Category | Order Date | Order Priority | Ship Date | Ship Mode | Region Did you mean sales region [recommended] chart

840

QUERY DISCOVERY AND INTERPRETATION

BACKGROUND

Enterprise software systems receive, generate, and store data related to many aspects of an enterprise. Users operate reporting tools to view and analyze such data. For example, a reporting tool may be used to submit a query to a system storing enterprise data. The system, which may be on-premise, cloud-based, or otherwise deployed, generates a result set based on the query and on the stored data, and returns the result set to the reporting tool for display and/or analysis.

In order to shield a user from the complexities of an underlying data storage schema, conventional systems associate intuitively-named logical objects with one or more physical entities (e.g., a physical database table, associated columns of one or more database tables) of the underlying data source. These objects may be classified as dimensions, along which one may want to perform an analysis or report (e.g., Year, Country, Product), or measures (e.g., Sales, Profit), whose values can be determined for a given combination of dimension members. For example, a user may operate a reporting tool to submit the query "Sales by Country".

A user is therefore required to possess some familiarity with the defined logical objects and with a corresponding query syntax. As the complexity of the desired result set increases, the formulation of an appropriate query may quickly overwhelm the user. Time and resources are inefficiently expended while attempting to formulate an appropriate query, and while attempting to understand the semantic meaning of a thus-formulated query. Enhancements are desired to support the formulation and understanding of user-generated queries.

BRIEF DESCRIPTION OF THE DRAWINGS

FIGS. 8C and 8D depict supplementing a query context and responsively displaying a corresponding data visualization according to some embodiments.

FIG. 9 depicts query token multi-suggestion within a query context in a user interface according to some embodiments.

FIG. 10 depicts query token recommendation within a query context in a user interface according to some embodiments.

DETAILED DESCRIPTION

The following description is provided to enable any person in the art to make and use the described embodiments. Various modifications, however, will remain readily-apparent to those in the art.

Generally, some embodiments identify tokens within a user query and provide a visual indication of a type of query entity associated with the identified token. Such embodiments may thereby allow a user to efficiently and seamlessly determine whether an input token is recognized as suitable for use in a query, and to determine whether the token has been recognized as a desired query entity type. Embodiments may include other features to further facilitate formulation of queries and understanding of formulated query semantics.

Figure 1:
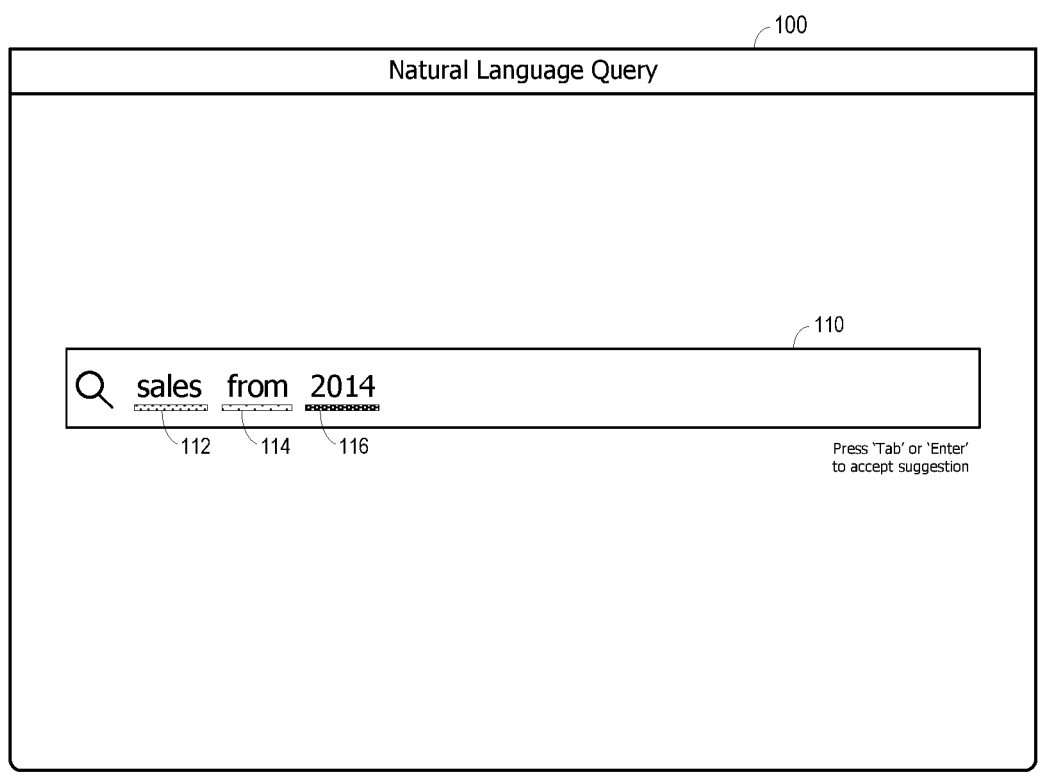
FIG. 1 is a view of a user interface to receive query tokens and visually indicate associated token types according to some embodiments.

FIG. 1 illustrates interface 100 according to some embodiments. Interface 100 may be presented on a display of a computing system executing a data reporting tool client for accessing data of a data source. Such a data reporting tool client may allow user input of queries of the data source via selection of dimensions, measures and filters as is known in the art, as well as the input of "natural language" queries via an interface such as interface 100. Embodiments are not limited to interface 100 or to use in a system supporting natural language queries.

Interface 100 includes input field 110. A user may input tokens into field 110 using a keyboard or other input device. The tokens are intended to represent a query for retrieving desired data from a data source. In the present example, the user has input the tokens "sales", "from" and "2014".

Each token of field 110 is associated with a respective one of graphical indicators 112, 114 and 116. Each of graphical indicators 112, 114 and 116 provides a visual indication of a query entity type of its associated token. Each of graphical indicators 112, 114 and 116 is associated with a different level of shading. Therefore, in the illustrated embodiment, each token is associated with a different query entity type.

Embodiments may utilize any query entity types that are or become known. Entity types may comprise, for example, database schema attributes such as dimensions and measures, query keywords such as "by", "for", "with", and named entities such as dates, numbers and currencies. In the present example, the token "sales" is of a Measure entity type, the token "from" is of a Keyword entity type, and the token "2014" is of a Date entity type.

Embodiments therefore comprise systems to identify an entity type associated with an input token. The systems may include various mapping components (e.g., keyword mapper, database entity mapper). Prior to mapping, syntactical analysis may be applied to identify parts of speech within input text. Identification of an entity type may include fuzzy matching. More than one entity type may be determined to match a particular token, with each matched entity being associated with a confidence value. In some embodiments, the entity type having the highest confidence value is graphically indicated as described herein. Entity matching may also incorporate a user profile (e.g., location) and user history (e.g., a user or group's most-used entities).

Embodiments may utilize any one or more graphical indications to indicate the entity type of a given token. According to some embodiments, each query entity type is associated with a color and the text of each token is colored based on the token's query entity type. Graphical indicators 112, 114 and 116 may also be presented in the appropriate colors. A graphical indication may be presented temporarily in order to provide visual feedback, and then be removed from interface 100. A graphical indication may include text, animation, font manipulation or any other means for conveying a query entity type of an input token.

Figure 2A:
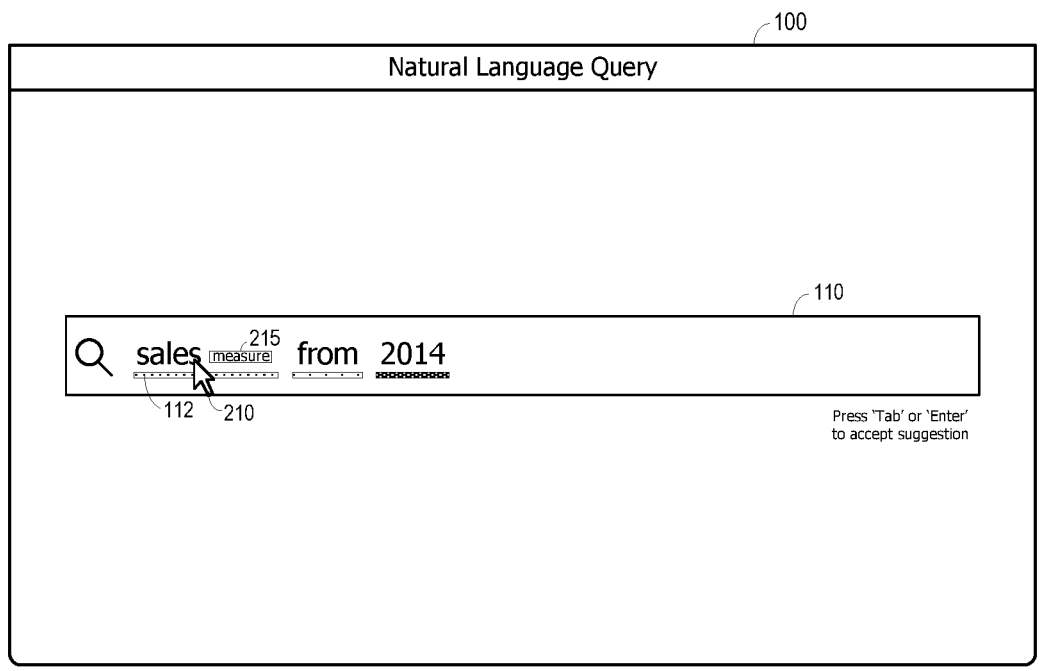
FIGS. 2A and 2B are views of a user interface to receive query tokens and visually indicate associated query entity types according to some embodiments.
Figure 2B:
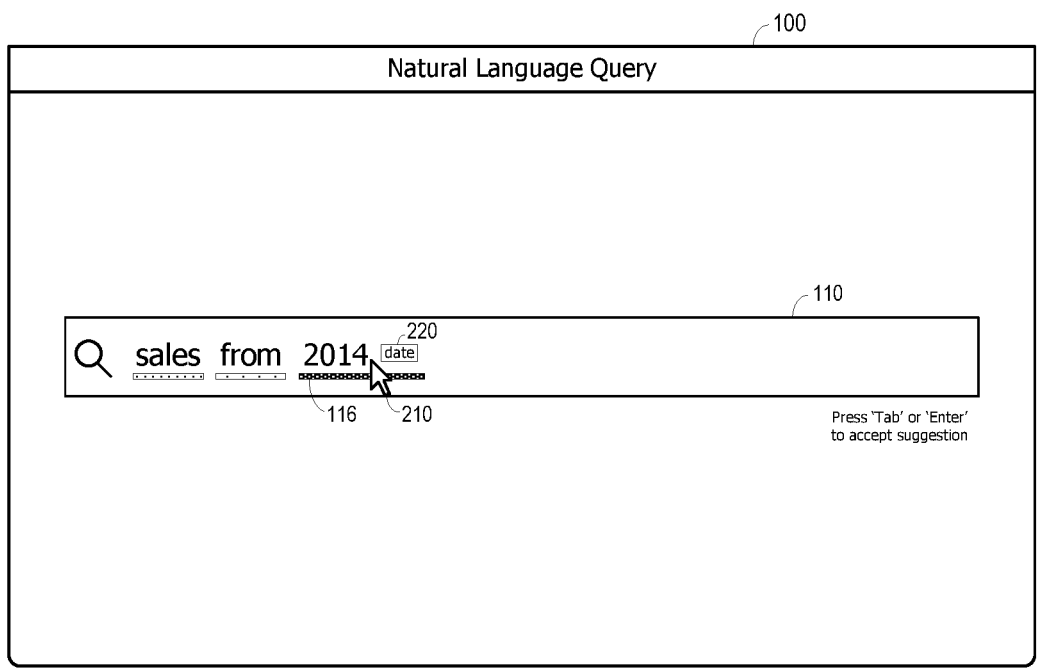

FIGS. 2A and 2B illustrate graphical indications of query entity types according to some embodiments. Assuming the tokens of FIG. 1 have been entered into input field 110 as described, FIG. 2A depicts operation of an input device to move cursor 210 over the token "sales". In response, user interface 100 expands the area and indicator 112 associated with the token "sales" and presents graphical indicator 215 associated with the token "sales". Graphical indicator 215 indicates, using text, that the token "sales" has been identified as a Measure entity. Graphical indicator 215 may also share one or more visual properties with indicator 112, all of which are associated with Measure entities. For example, graphical indicators 112 and 215 may be of a same color.

FIG. 2B depicts cursor 210 hovering over the token "2014", in response to which indicator 116 is expanded and graphical indicator 220 associated with the token "2014" is displayed. Graphical indicator 220 indicates that the token "2014" has been identified as a Date entity. Graphical indicator 220 may also share one or more visual properties with indicator 116, such as a color or pattern.

Figure 3A:
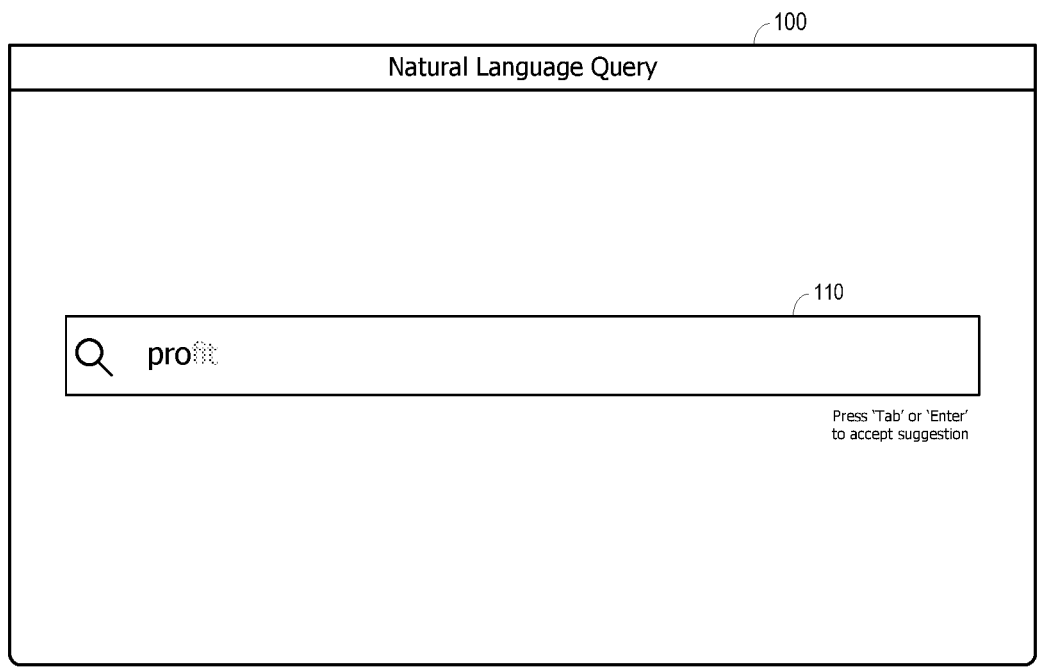
FIGS. 3A through 3F depict query correction and query token suggestion in a user interface according to some embodiments.
Figure 3B:
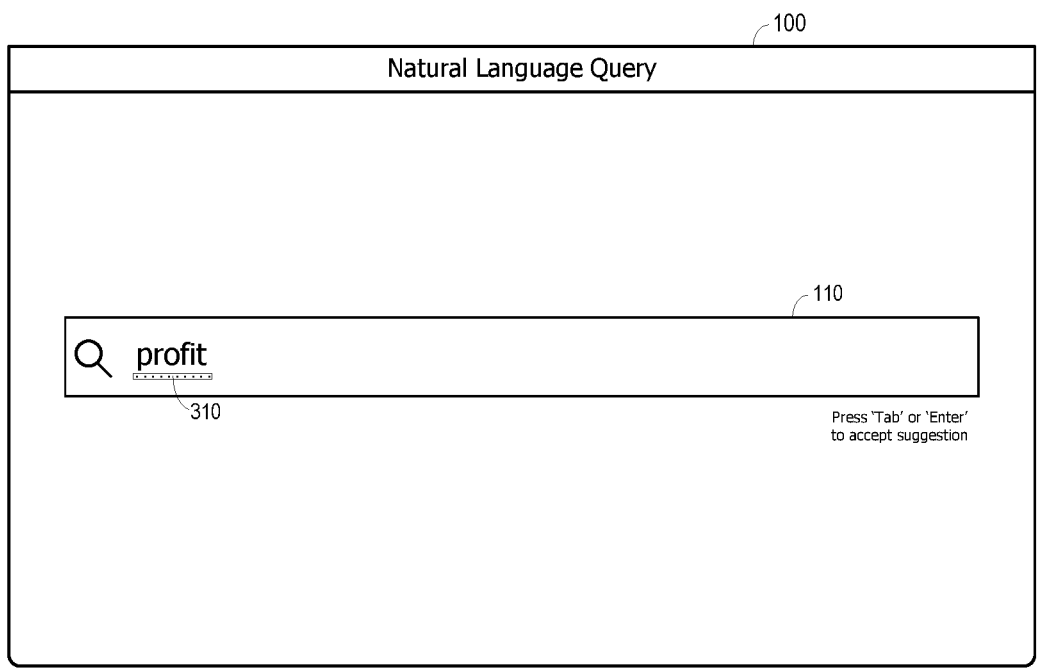

FIGS. 3A through 3F depict text entry according to some embodiments. FIG. 3A illustrates user interface 100 after a user has typed "pro" into input field 110. "Profit" has been identified as a potential matching entity (i.e., a Measure entity) and is presented as an inline suggestion as shown. It will be assumed that the user accepts this suggestion (i.e., by pressing "Tab" or "Enter" in the present example) and therefore the token "profit" is displayed along with graphical indicator 310 indicating that the token is recognized as a Measure entity.

Figure 3C:
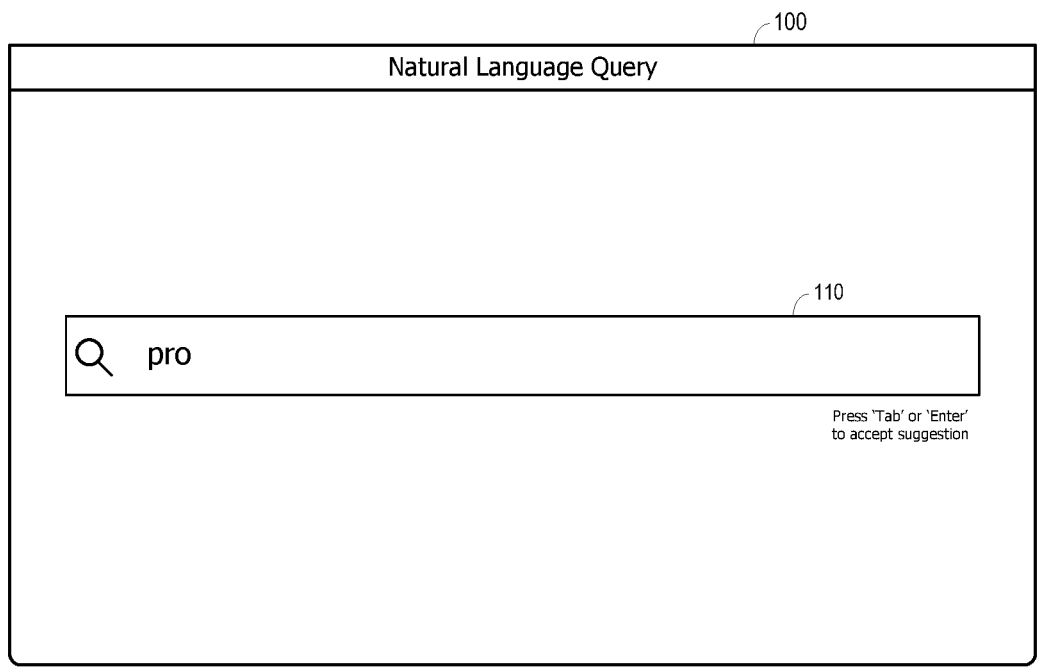
Figure 3D:
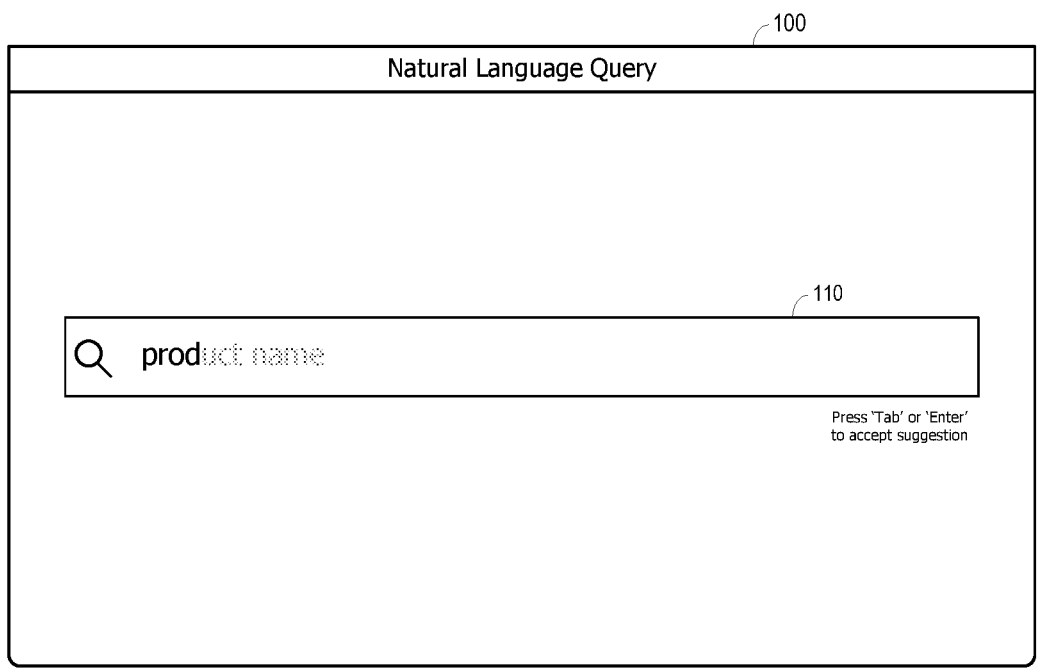

It will now be assumed that the user presses Backspace, in which case the previously-typed letters "pro" are redisplayed as shown in FIG. 3C. Advantageously, the accepted entity "profit" is not entirely deleted upon pressing of Backspace, permitting the user to continue typing from where typing last terminated. For example, FIG. 3D shows interface 100 after the user has typed "d", in response to which the Dimension entity "Product Name" is identified and displayed as an inline suggestion.

Figure 3E:
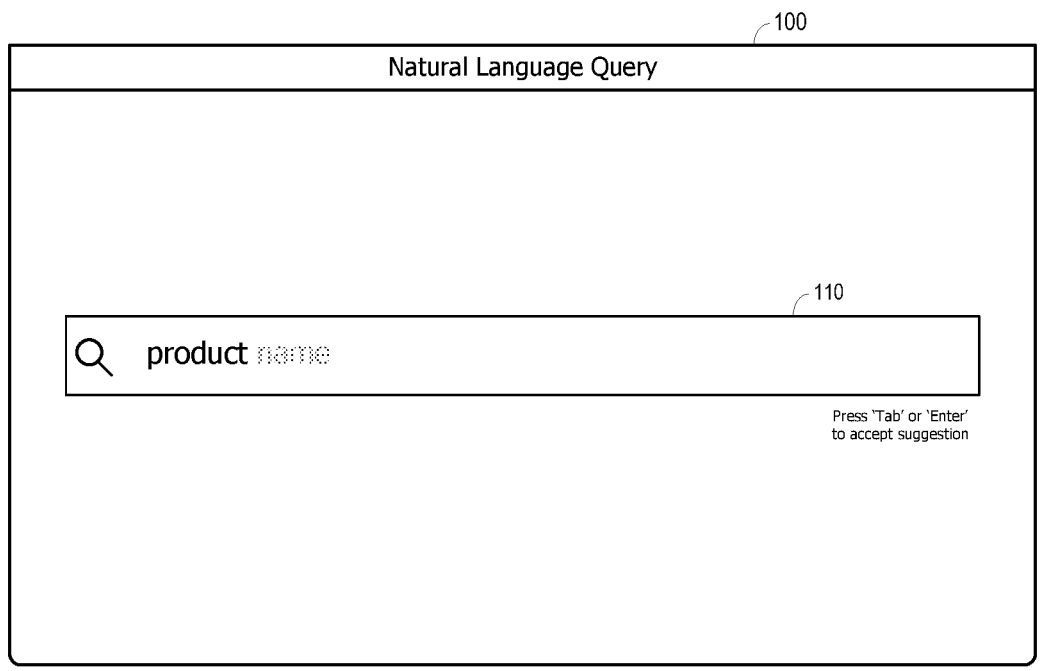
Figure 3F:
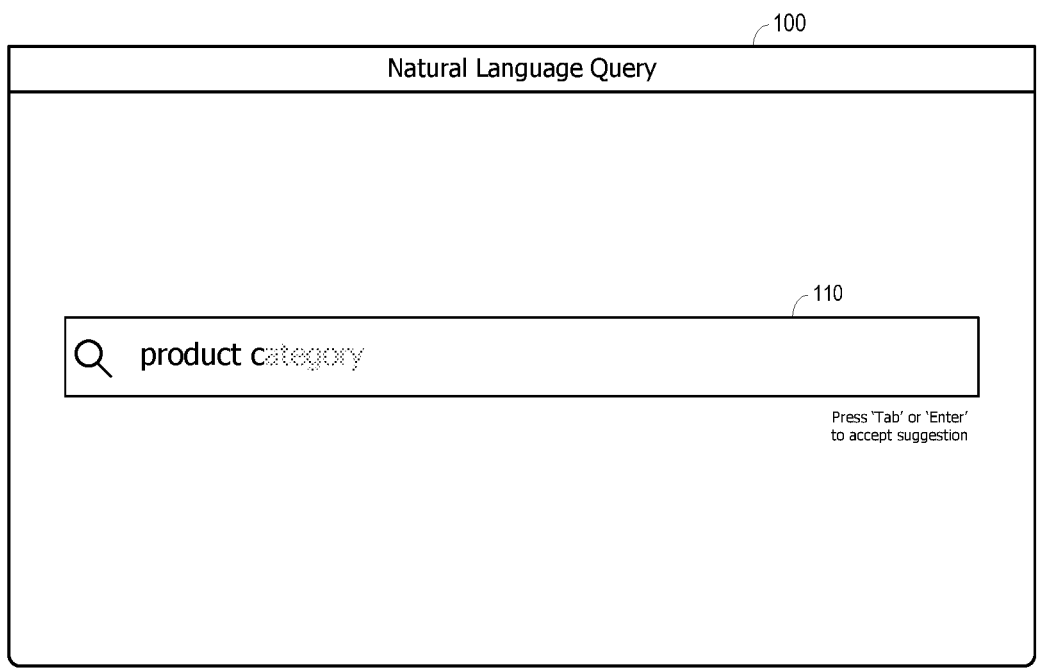

As shown in FIG. 3E, the user does not accept the suggestion "Product Name" and instead types a Space. Since "Product Name" continues to be identified as the best-matching entity, it continues to be displayed as an inline suggestion. The user then types "c" as shown in FIG. 3F. In response, the matching Dimension entity "Product Category" is determined and displayed as an in-line suggestion.

Figure 4A:
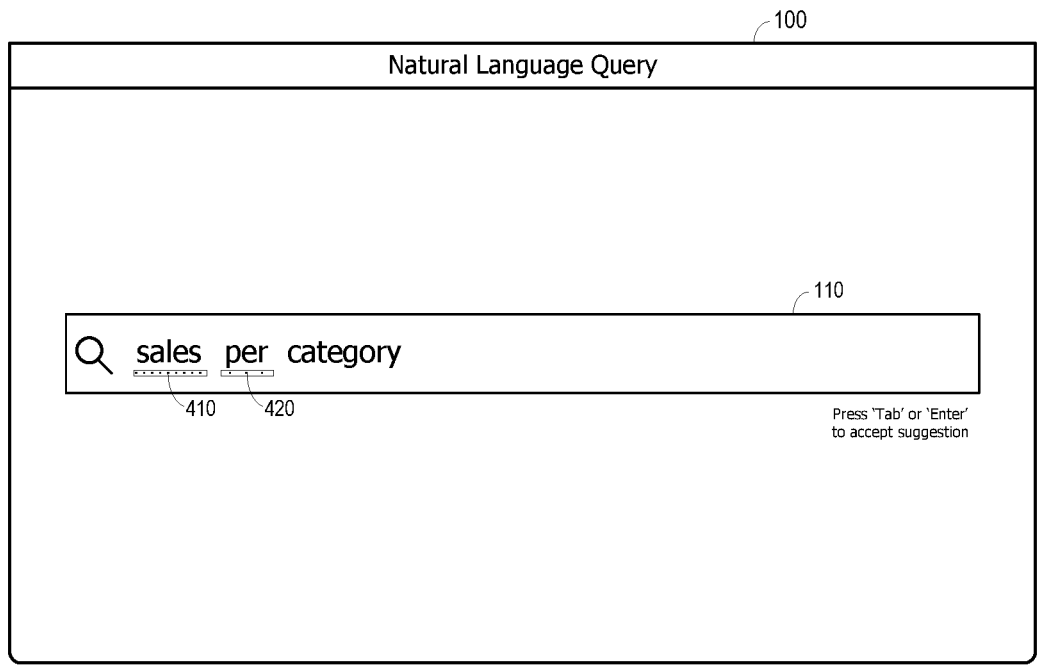
FIGS. 4A and 4B depict query token multi-suggestion in a user interface according to some embodiments.
Figure 4B:
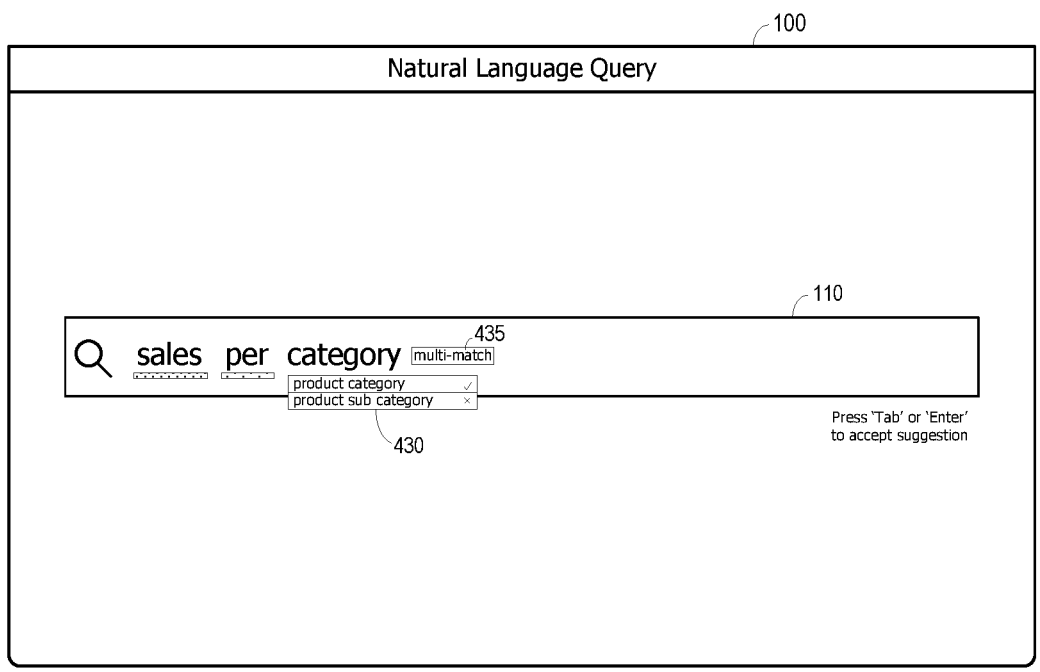

As mentioned above, an input token may be determined to match more than one query entity. FIGS. 4A and 4B illustrate operation of some embodiments in a case that more than one query entity matches an input token with a high confidence level.

FIG. 4A shows user entry of tokens "sales" "per" and "category". Tokens "sales" and "per" are recognized as they are typed and associated graphical indicators 410 and 420 (denoting a Measure entity and a Keyword entity, respectively) are displayed in association therewith as described above. It will be assumed that the user pauses after typing the token "category".

In response to the pause, menu 430 is displayed in association with the token "category". Menu 430 indicates two entities which have been determined to match the token with a high confidence level, and indicates a default query entity (i.e., Product Category) which will be selected upon pressing Tab or Enter. Indicator 435 also indicates that the token has matched more than one entity.

Figure 5A:
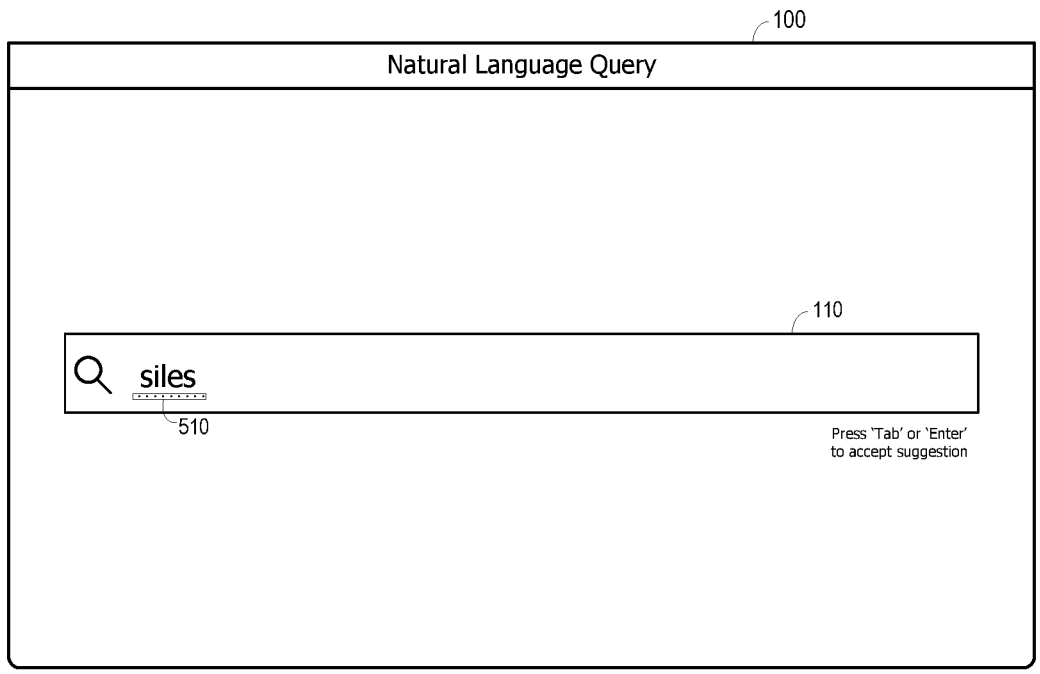
FIGS. 5A and 5B depict identification of a misspelled query token and query entity type indication in a user interface according to some embodiments.
Figure 5B:
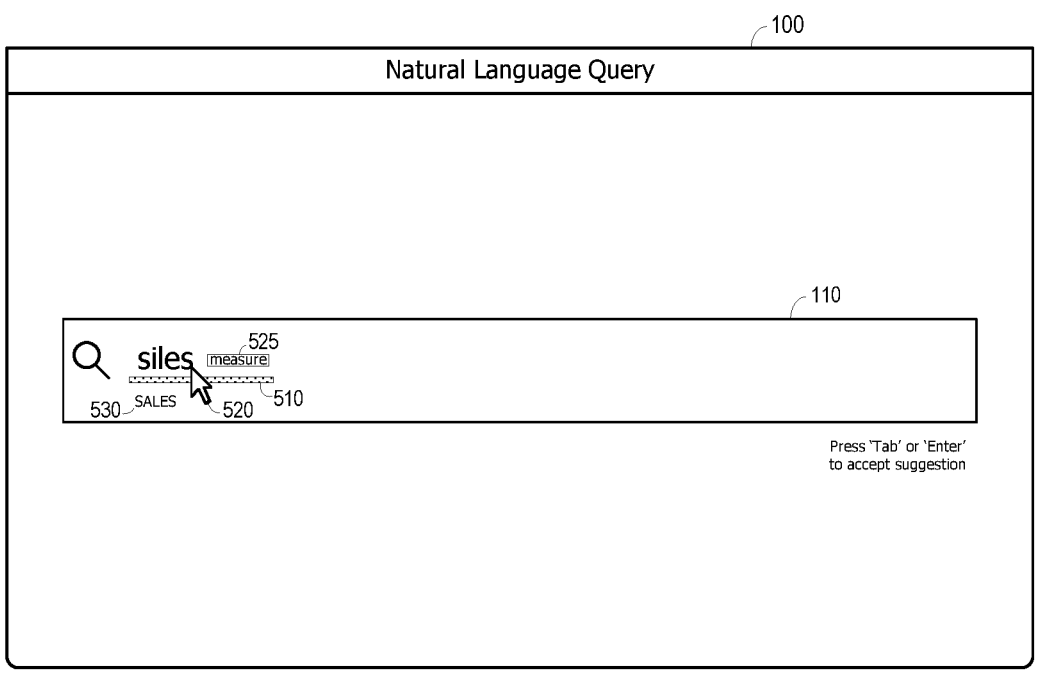

FIGS. 5A and 5B illustrated handling of misspelled tokens according to some embodiments. FIG. 5A depicts entry of the token "siles". As shown, the token has been recognized as an entity (i.e., a Measure entity) and graphical indicator 510 is therefore displayed in association therewith.

FIG. 5B depicts cursor 520 hovering over the token "sales". In response, and as described with respect to FIGS. 2A and 2B, indicator 510 is expanded and graphical indicator 525 associated with the token "siles" is displayed. Also displayed is entity name "SALES" 530, which indicates the actually-recognized entity name which was determined to match input token "siles".

Figure 6A:
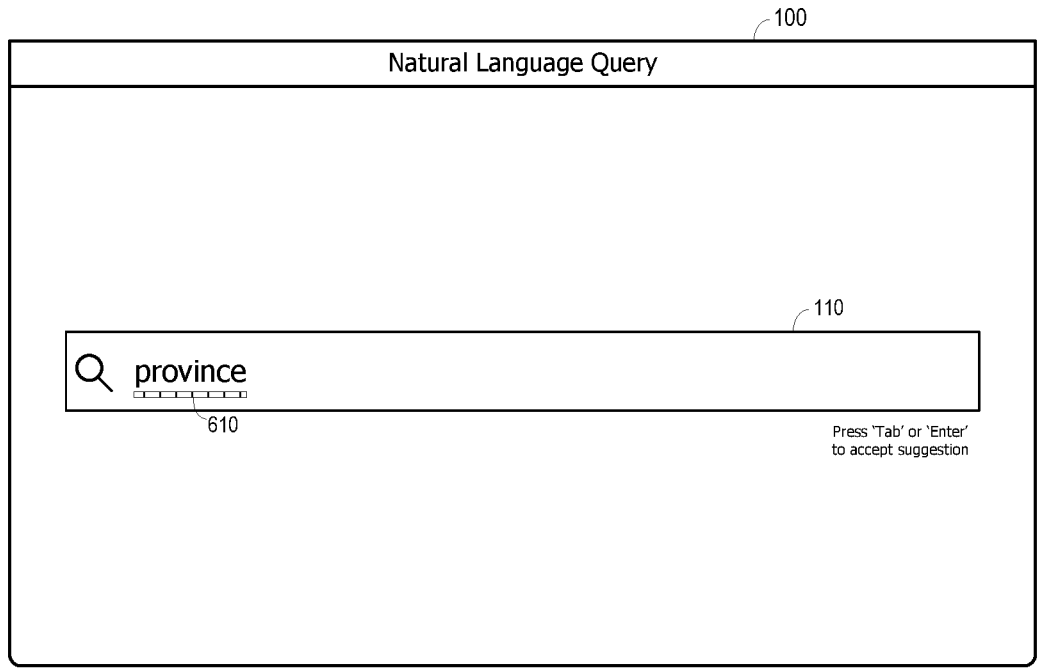
FIGS. 6A and 6B depict identification of a query token and query entity type indication in a user interface according to some embodiments.
Figure 6B:
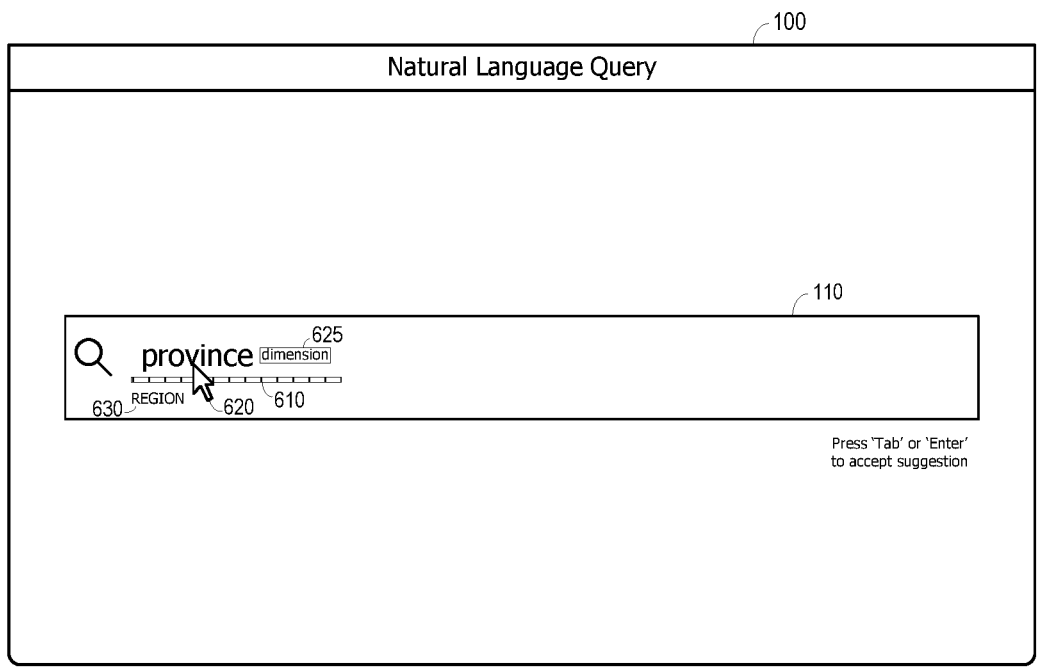

FIGS. 6A and 6B illustrated handling of tokens which are similar to query entities according to some embodiments. FIG. 6A depicts entry of the token "province". FIG. 6A also shows that the token has been recognized as an entity (i.e., a Dimension entity) and graphical indicator 610 is therefore displayed in association therewith.

FIG. 6B depicts cursor 620 hovering over the token "sales". Hovering of the cursor causes expansion of indicator 610 and display of graphical indicator 625 indicating the query entity type associated with the token. Also displayed is entity name "REGION" 530, which indicates the actually-recognized entity name which was determined to match input token "province". Similarity according to some embodiments may be lexical, in which grammatical synonyms are identified, and/or semantic, in which semantically similar words which co-occur in similar contexts are identified.

Figure 7A:
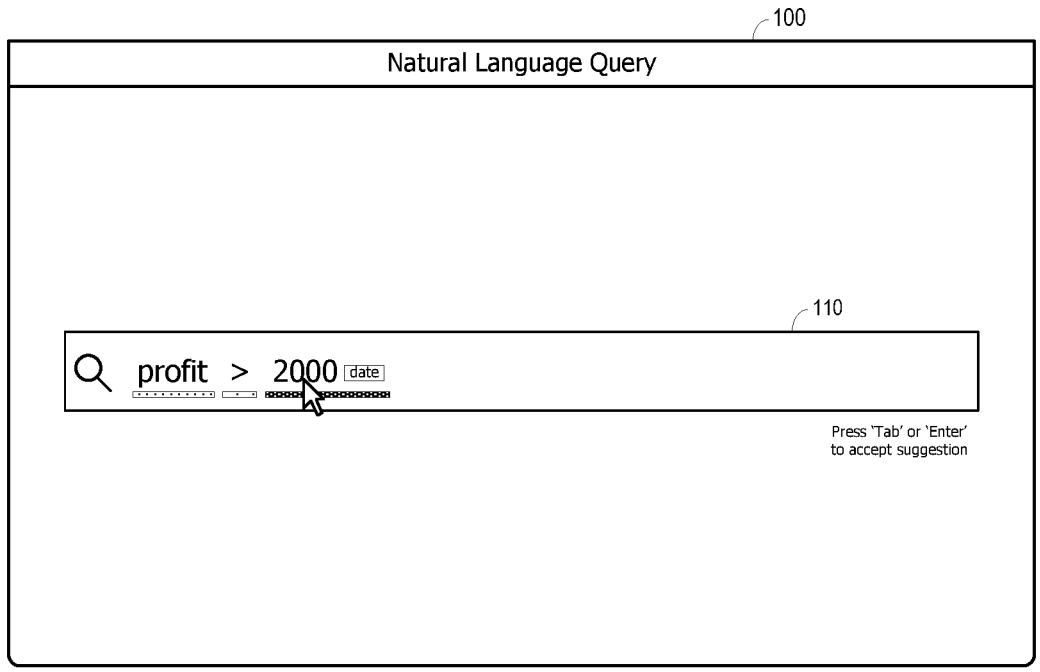
FIGS. 7A through 7C depict overriding of query token identification in a user interface according to some embodiments.
Figure 7B:
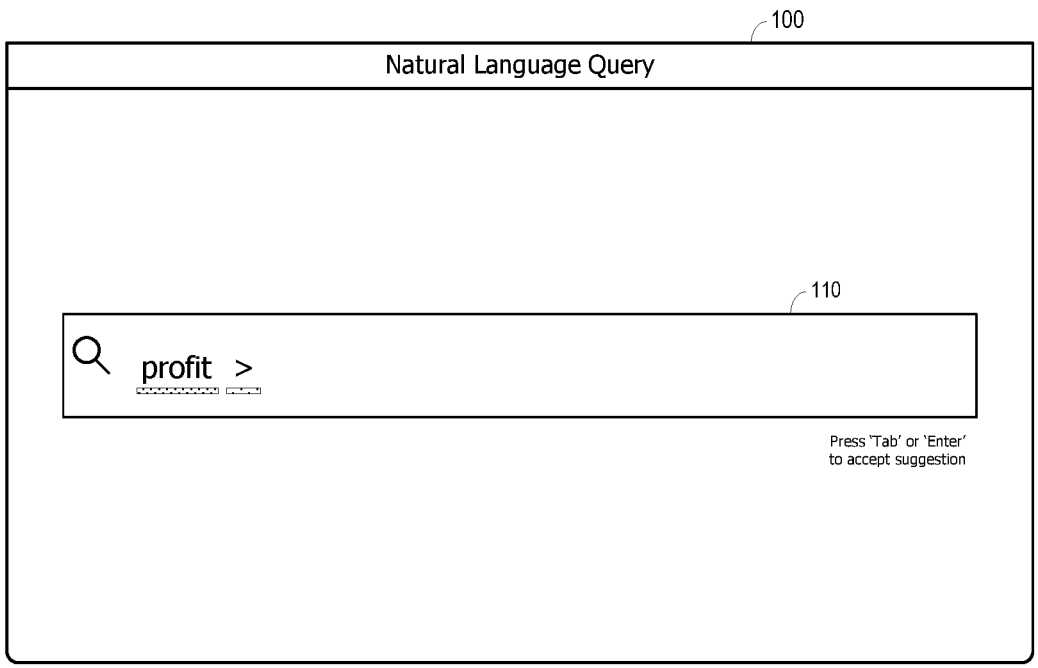
Figure 7C:
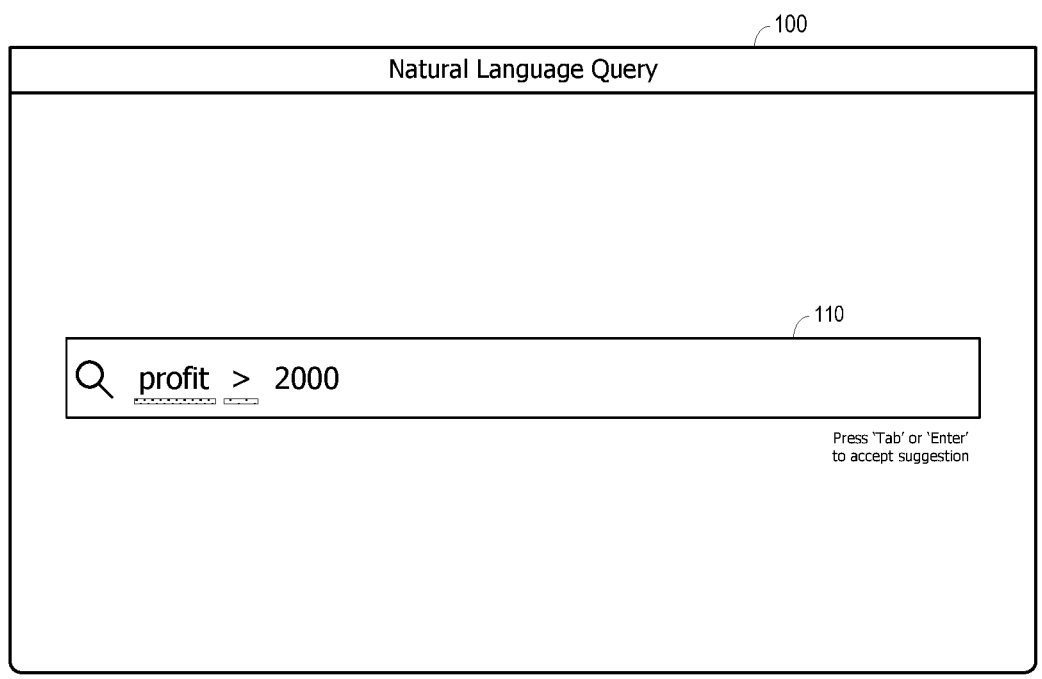

FIGS. 7A through 7C illustrate a system to override a determined entity match according to some embodiments. In FIG. 7A, the user has entered the tokens "profit", ">" and "2000". Each token has been recognized as a query entity associated with a query entity type, and is displayed with a corresponding graphical indicator. In particular, token "2000" has been recognized as a Date entity.

FIG. 7B illustrates subsequent depressing of a Backspace key by the user. Backspace results in removal of the token "2000" and its associated graphical indicators. It will be assumed that the user again inputs the token "2000", returning to the scenario shown in FIG. 7A. That is, the token "2000" is again recognized as a Date entity. The user selects Backspace again, resulting in the interface of FIG. 7B. If the user again inputs the token "2000", the system learns that "2000" is not to be recognized as a Date entity and the token is displayed without graphical indications of its query entity type as shown in FIG. 7C. The learning may be context-based, may be user-specific, and may carry over to future determinations of matching entities.

Figure 8A:
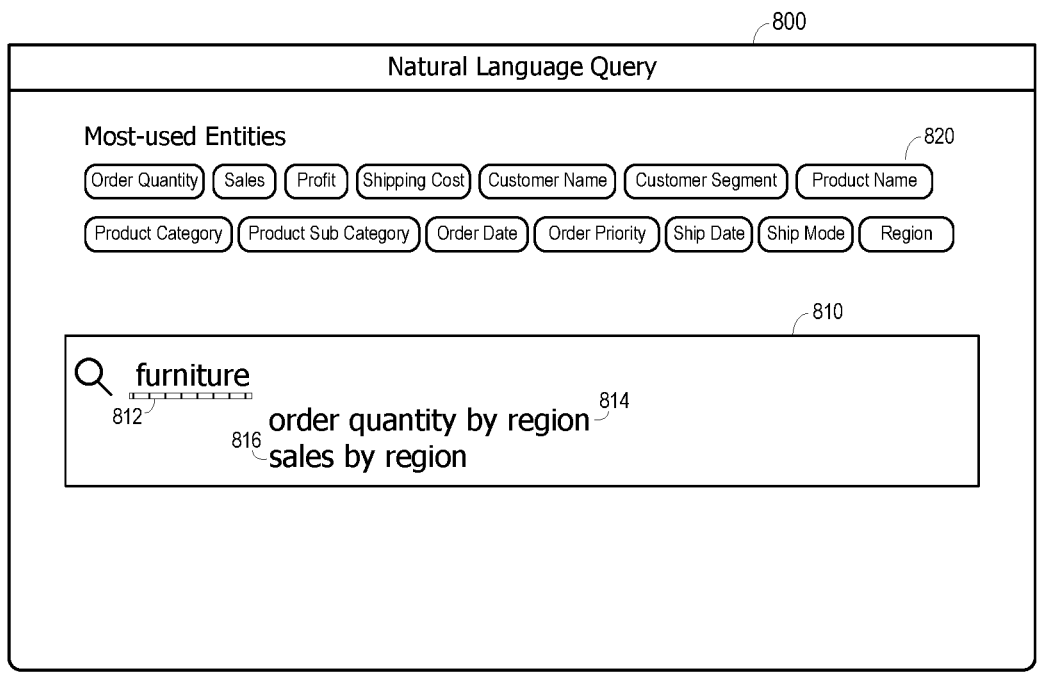
FIG. 8A depicts query suggestion and selection of most-used schema attributes according to some embodiments.

FIG. 8A illustrates user interface 800 according to some embodiments. Any of the elements of user interface 800 may be used in conjunction with any of the elements or operations described above with respect to FIGS. 1 through 7C.

A user has input the token "furniture" into input filed 810. The token has been matched to a query entity and graphical indicator 812 indicates a type of the matched query entity. In response to the input token, the system determines and displays query suggestions 814 and 816. The query suggestions may be determined in real-time based on the tokens entered by the user.

In some embodiments, query suggestions are displayed only if the user pauses for greater than a predetermined interval while typing. This reduces the potential intrusiveness of displayed suggestions during input of a valid query. According to some embodiments, the user may request query suggestions by depressing the down arrow during typing. The query suggestions may be filtered by prefix matching, and sorted by match score, length, and alphabetically.

Query suggestions may be determined using a query suggestion model. Such a query suggestion model may be trained using full queries that were successfully executed. The full queries used for training the model include the input tokens and their determined query entity types (e.g., Measure, Dimension, Keyword). The training queries may be those input by a single user across multiple sessions or by multiple users across multiple sessions.

A compact tree data structure may be constructed to compresses the entire training data into the form of a tree. Each branch of the tree forms a sequence of words that translate into a query. An abstract version of the tree can be created using placeholder tokens (e.g., <measure>, <dimension>) instead of the actual attributes of the queries. This abstract version may be created from queries input by multiple users across multiple sessions. This tree may be used to predict abstract versions of the queries, where the placeholder tokens of the abstract versions are filled with most-used data attribute values for the current user.

Area 820 of interface 800 displays most-used data schema attributes for selection by the user. Selection of a displayed schema attribute may cause the selected attribute to be added to the tokens of input field 810. Determination of the most-used data schema attributes to display may be based on tracking of attribute usage within queries over multiple sessions and multiple users for the same data source.

Figure 8B:
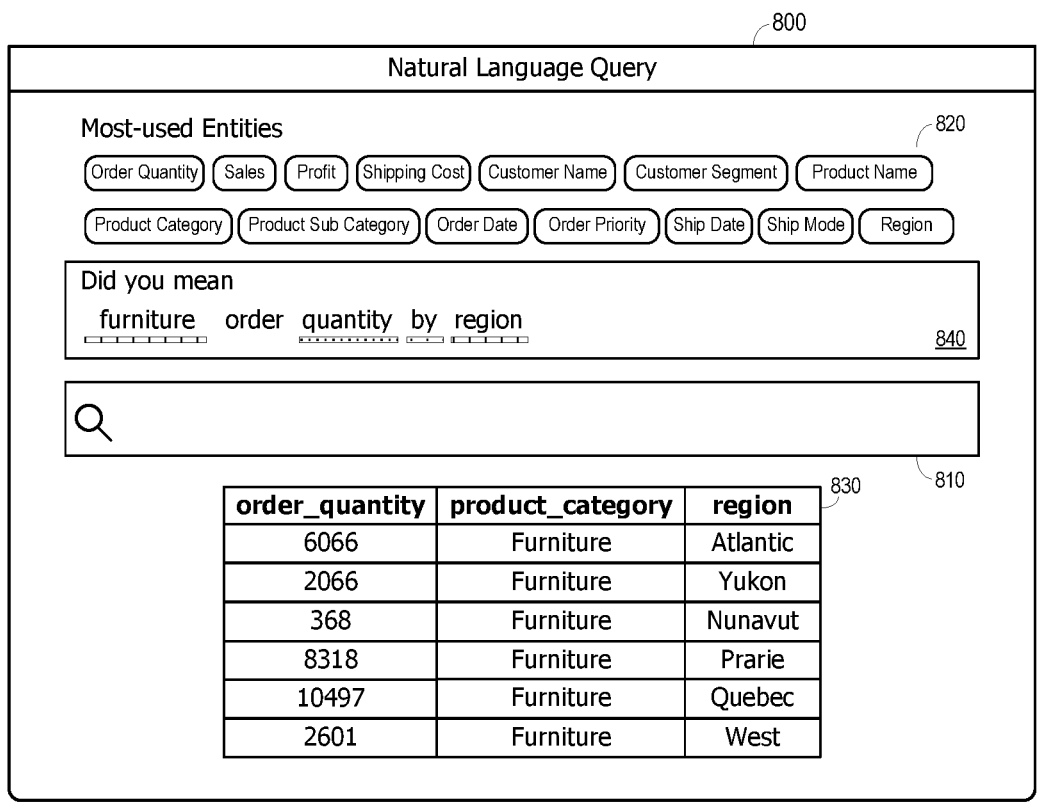
FIG. 8B depicts a query context and corresponding data visualization according to some embodiments.

FIG. 8B illustrates user selection of query suggestion 814 according to some embodiments. In the illustrated embodiment, selection of the query suggestion causes execution of the query against a data source and return of a result set. Table 830 displays the result set.

The executed query is displayed within context box 840. Context box 840 allows the user to identify the currently-executed query. Moreover, the entities of context box 840 may be added to, removed or manipulated to support further exploration of the data source as will be described below.

FIG. 8C depicts input of the token "chart" into input field 110. The token is recognized as a query entity of Keyword type. Selection of the token adds the token to the query of context box 840, as shown in FIG. 8D. Accordingly, a corresponding visualization 850 is displayed.

FIG. 9 depicts an embodiment in which multiple entity matches may be indicated in context box 840 as described above with respect to FIGS. 4A and 4B. FIG. 10 illustrates the graphical indication of an entity recommendation in context box 840. Such an entity recommendation may be graphically presented within input field 110 during token entry in some embodiments. User selection of one of the multiple entity matches of FIG. 9 or the recommended entity of FIG. 10 may comprise an indication of user preference that may be used in subsequent determinations of matching entities and/or entity recommendations.

Figure 11A:
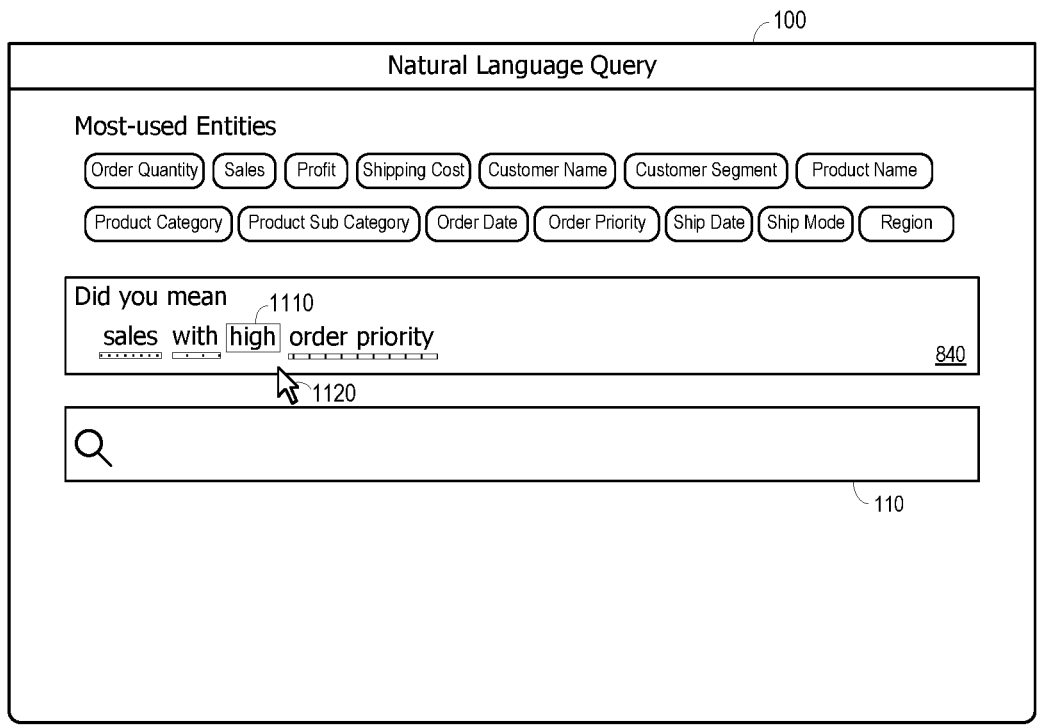
FIGS. 11A and 11B depict display and member selection of a low cardinality query entity type within a query context in a user interface according to some embodiments.
Figure 11B:
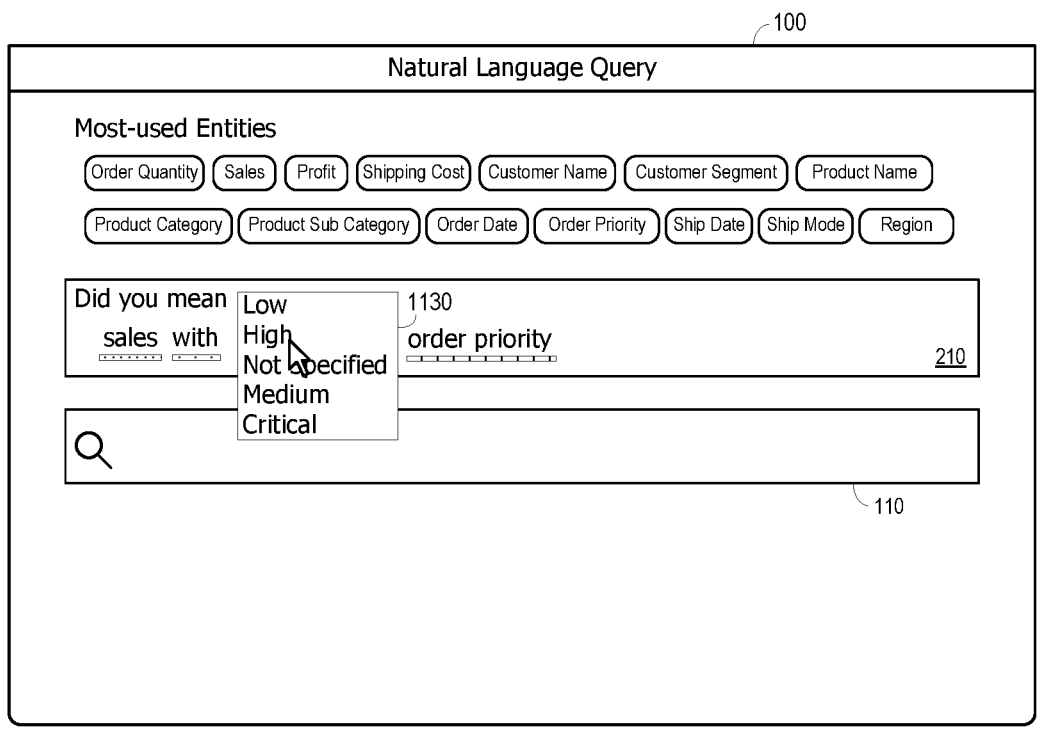

FIGS. 11A and 11B depict another graphical indicator to associated with query tokens according to some embodiments. Indicator 1110, which is not limited to a circumscribing box as shown, indicates that the associated token "high" is associated with a query entity type of low cardinality. Accordingly, upon moving cursor 1120 over the token, all other members 1130 of the entity type are displayed and selectable as shown in FIG. 11B. A similar low-cardinality graphical indicator may be provided in input field 110 during token entry in some embodiments.

Figure 12:
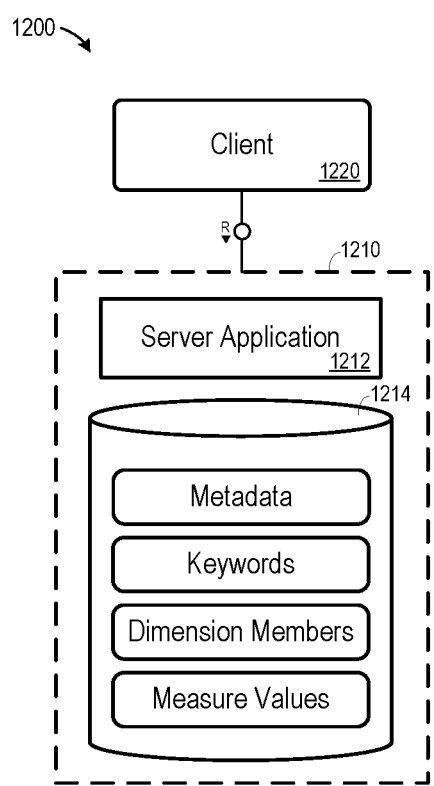
FIG. 12 is a block diagram of a system architecture according to some embodiments.

FIG. 12 is a block diagram of system architecture 1200 according to some embodiments. System architecture 1200 may implement operation of user interfaces and associated backend processing as described above. Embodiments are not limited to system architecture 1200 or to a database architecture.

Architecture 1200 includes data server 1210 and client 1220. Generally, data server 1210 receives requests from client 1220 and provides results to client 1220 based on those requests. Server application 1212 may be separated from or closely integrated with data store 1214. Server application 1212 may be executed completely on the database platform of data store 1214, without the need for an additional server. Architecture 1200 may be implemented using any client-server architecture that is or becomes known, including but not limited to on-premise, cloud-based and hybrid architectures.

In one specific example, client 1220 executes an application to present a user interface to a user. The user enters a query into the user interface, and client 1220 forwards a request based on the query to server 1210. Server application 1212 may further provide processing of input tokens as described above, to facilitate user formulation of the query.

Server application 1212 generates an SQL script based on the request and forwards the SQL script to data store 1214. Data store 1214 executes the SQL script to return a result set based on data of data store 1214, and client 1220 generates and displays a report/visualization based on the result set.

Data store 1214 stores metadata defining attributes such as dimensions and measures, keywords, dimension members, and measure values. All of the data of data store 1210 may be used as described above to identify matching query entities and query entity types.

The data of data store 1214 may comprise one or more of conventional tabular data, row-based data, column-based data, and object-based data. Moreover, the data may be indexed and/or selectively replicated in an index to allow fast searching and retrieval thereof. Data store 1214 may support multi-tenancy to separately support multiple unrelated clients by providing multiple logical database systems which are programmatically isolated from one another.

Data store 1214 may comprise any query-responsive data source or sources that are or become known, including but not limited to a structured-query language (SQL) relational database management system. Data store 1214 may comprise a relational database, a multi-dimensional database, an eXtendable Markup Language (XML) document, or any other data storage system storing structured and/or unstructured data. The data of data store 1214 may be distributed among several relational databases, dimensional databases, and/or other data sources. Embodiments are not limited to any number or types of data sources.

Data store 1214 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 1220 may comprise one or more devices executing program code of an application for presenting user interfaces to allow interaction with server 1210. The user interfaces may be suited for reporting, data analysis, and/or any other functions based on the data of data store 1214.

Figure 13:
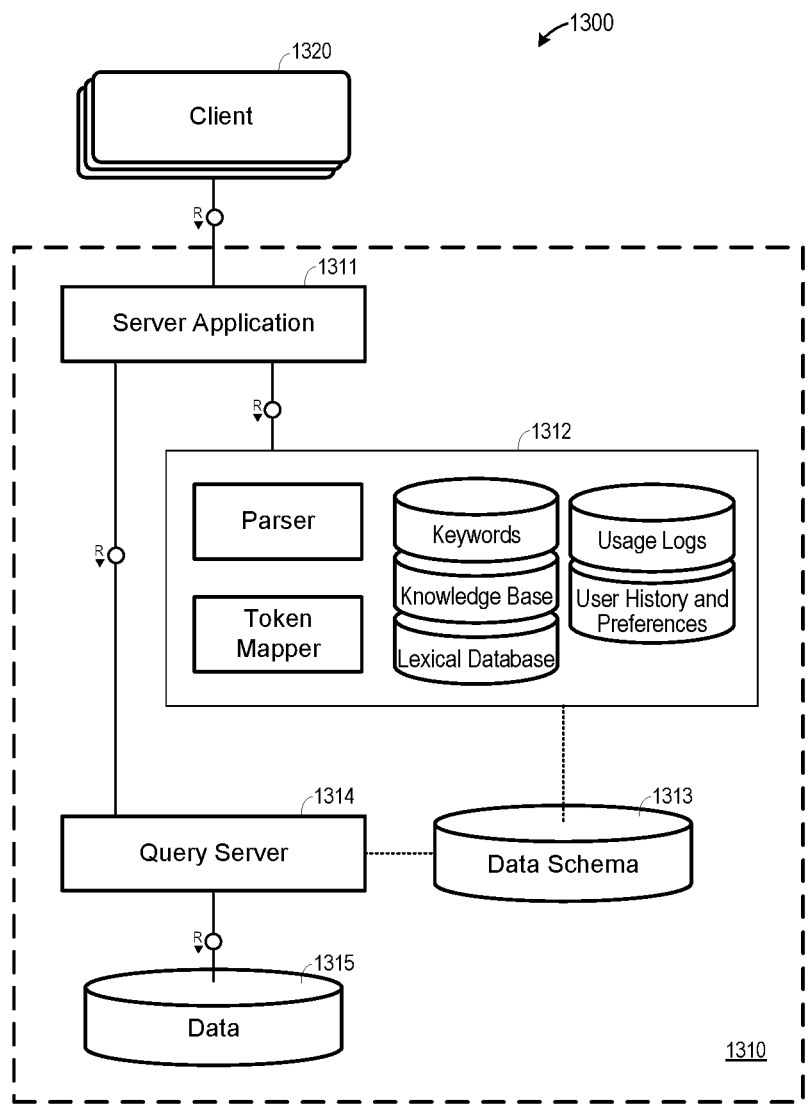
FIG. 13 is a block diagram of a system architecture according to some embodiments.

FIG. 13 is an architecture of system 1300 according to some embodiments. According to system 1300, server application 1311 of platform 1310 receives requests from one of clients 1320 and responds to the requests using entity identifier 1312 and query server 1314.

For example, server application 1311 may provide a user interface such as interface 100 to client 1320. Client 1320 receives tokens input by a user and server application 1311 submits a request to identifier 1312 to identify the input tokens. As described above, identifier 1312 may identify several entities for a given token, each associated with a respective confidence level. Identifier 1312 may therefore return one or more matching entities and respective confidence levels to server application 1311.

Entity identifier 1312 according to the illustrated embodiments includes a parser to identify parts of speech within the input tokens. The example uses a lexical database for such parsing but embodiments are not limited thereto. The parser may also remove stop words from the tokens prior to passing the tokens to a token mapper. Generally, the token mapper, which may include sub-mapping components, maps entities to keywords of a keyword store, named entities from a knowledge base, and schema attributes specified in data schema 1313. Token mapping, and determination of confidence levels, may further be based on usage logs and user history and preferences as described above.

Server application 1311 may format the input tokens of the graphical interface using graphical indicators, inline suggestions, or the like as described above based on the identified matching entities. Once a query is formulated, the client 1320 submits the query to server application 1311, which in turn forwards the query to query server 1314. Based on the data schema 1313, query server 1314 queries data store 1315 and receives a result set. The result set is returned to the client 1320, in raw form, as a visualization, or otherwise.

Each element of systems 1200 and 1300 may be may be implemented at least in part in computer hardware, in program code and/or in one or more computing systems executing such program code as is known in the art. Such a computing system may include one or more processing units which execute processor-executable program code stored in a memory system.

Figure 14:
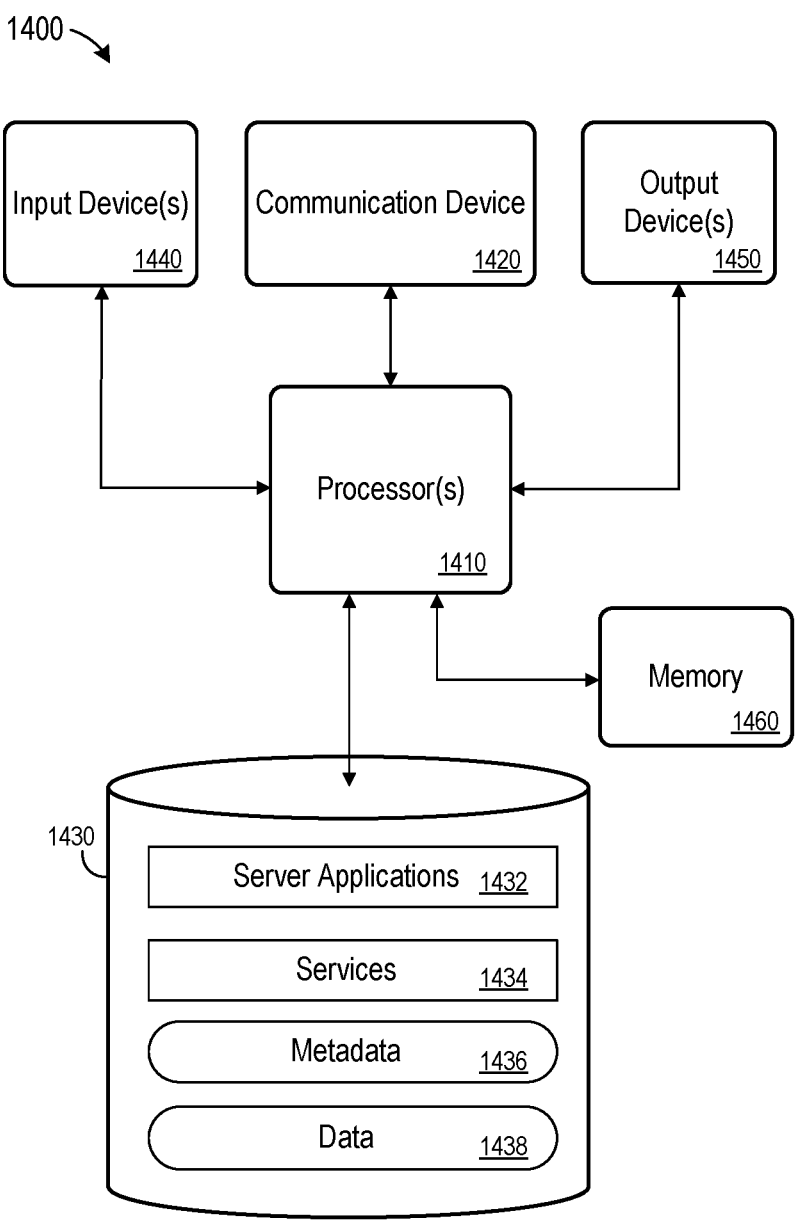
FIG. 14 is a block diagram of an apparatus according to some embodiments.

FIG. 14 is a block diagram of apparatus 1400 according to some embodiments. Apparatus 1400 may comprise a general-purpose computing apparatus and may execute program code to perform any of the functions described herein. Apparatus 1400 may comprise an implementation of server 1210 or entity identifier 1312 in some embodiments. Apparatus 1400 may include other unshown elements according to some embodiments.

Apparatus 1400 includes processor(s) 1410 operatively coupled to communication device 1420, data storage device 1430, one or more input devices 1440, one or more output devices 1450 and memory 1460. Communication device 1420 may facilitate communication with external devices, such as a reporting client, or a data storage device. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to enter information into apparatus 1400. Output device(s) 1450 may comprise, for example, a display (e.g., a display screen), a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, etc., while memory 1460 may comprise Random Access Memory (RAM), Storage Class Memory (SCM) or any other fast-access memory.

Server applications 1432 and services 1434 may comprise program code executed by processor 1410 to cause apparatus 1400 to perform any one or more of the processes described herein. Embodiments are not limited to execution of these processes by a single apparatus.

Metadata 1436 and data 14314 (either cached or a full database) may be stored in volatile memory such as memory 1460. Metadata 1436 may include information regarding keywords, dimensions, dimension values, measures associated with the data sources of data 1438. Data storage device 1430 may also store data and other program code for providing additional functionality and/or which are necessary for operation of apparatus 1400, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system comprising:
one or more hardware processors to:
processes a token received from a first user input into a user interface;
determine at least two query entities associated with the token and entity types associated with each of the at least two query entities, the entity types being selected from a group of entity types comprising at least database schema attributes, the database schema attributes comprising at least dimensions and measures;
initiate display, on the user interface, of:
a multi-query entity indicator indicating that the token has been matched with the at least two query entities,
a menu indicating the at least two query entities determined to match with the token with at least a threshold confidence level, wherein a particular query entity of the at least two query entities is selected in response to a second user input,
a first graphical indicator comprising at least a particular color or shade to indicate the determined entity type for the selected query entity of the at least two query entities in response to the second user input, and
a textual indication of the determined entity type associated with the selected query entity and with the token in response to receiving a third user input to cause a movable second graphical indicator to hover over the token.

2. The computing system according to claim 1, wherein the entity types comprise one or more of a measure or a dimension.

3. The computing system according to claim 1, the computing system to:
receive a second token input by the user into the user interface during display of the first graphical indicator on the user interface in association with the token;
in response to reception of the second token, determine a second query entity associated with the second token, the second query entity associated with a second entity type; and
display a second graphical indicator on the user interface in association with the second token during display of the first graphical indicator on the user interface in association with the token, the second graphical indicator indicating the second entity type.

4. The computing system according to claim 3, wherein the determined entity type for the selected query entity is a measure and the second entity type is a dimension, the computing system further to:
receive a query comprising the selected query entity and the second query entity;
execute the query to determine a result set; and
display a visualization of the result set on the user interface.

5. The computing system according to claim 1, wherein the selected query entity is not identical to the token.

6. The computing system according to claim 1, the computing system further to:
receive a query comprising the selected query entity;
execute the query to determine a result set; and
display a visualization of the result set on the user interface.

7. The computing system according to claim 6, the computing system further to:

display the query on the user interface during display of the visualization of the result set on the user interface;
receive a second token input by the user into the user interface during display of the query on the user interface and during display of the visualization of the result set on the user interface;
in response to reception of the second token, determine a second query entity associated with the second token, the second query entity associated with a second entity type;
display a second graphical indicator on the user interface in association with the second token during display of the query on the user interface and during display of the visualization of the result set on the user interface, the second graphical indicator indicating the second entity type;
execute a second query including the query and the second query entity to determine a second result set; and
display a second visualization of the second result set on the user interface.

8. A computer-implemented method comprising:
processing a token received from a first user input into a user interface;
determining at least two query entities associated with the token and entity types associated with each of the at least two query entities, the entity types being selected from a group of entity types comprising at least database schema attributes, the database schema attributes comprising at least dimensions and measures;
initiating display, on the user interface, of:
a multi-query entity indicator indicating that the token has been matched with the at least two query entities,
a menu indicating the at least two query entities determined to match with the token with at least a threshold confidence level, wherein a particular query entity of the at least two query entities is selected in response to a second user input,
a first graphical indicator comprising at least a particular color or shade to indicate the determined entity type for the selected query entity of the at least two query entities in response to the second user input, and
a textual indication of the determined entity type associated with the selected query entity and with the token in response to receiving a third user input to cause a movable second graphical indicator to hover over the token.

9. The method according to claim 8, wherein the entity types comprise one or more of a measure or a dimension.

10. The method according to claim 8, further comprising:
receiving a second token input by the user into the user interface during display of the first graphical indicator on the user interface in association with the token;
in response to receiving the second token, determining a second query entity associated with the second token, the second query entity associated with a second entity type; and
adding a second graphical indicator to the user interface in association with the second token during display of the first graphical indicator on the user interface in association with the token, the second graphical indicator indicating the second entity type.

11. The method according to claim 10, wherein a first the determined entity type for the selected query entity is a measure and the second entity type is a dimension, further comprising:

receiving a query comprising the selected query entity and the second query entity;

executing the query to determine a result set; and displaying a visualization of the result set on the user interface.

12. The method according to claim 8, wherein the selected query entity is not identical to the token.

13. The method according to claim 8, further comprising:

receiving a query comprising the selected query entity;

executing the query to determine a result set; and displaying a visualization of the result set on the user interface.

14. The method according to claim 13, further comprising:

displaying the query on the user interface during display of the visualization of the result set on the user interface;

receiving a second token input by the user into the user interface during display of the query on the user interface and during display of the visualization of the result set on the user interface;

in response to reception of the second token, determining a second query entity associated with the second token, the second query entity associated with a second entity type;

adding a second graphical indicator to the user interface in association with the second token during display of the query on the user interface and during display of the visualization of the result set on the user interface, the second graphical indicator indicating the second entity type;

executing a second query including the query and the second query entity to determine a second result set; and displaying a second visualization of the second result set on the user interface.

15. A computer-implemented system comprising:

a non-transitory storage medium to store executable instructions; and one or more hardware processors to execute the instructions to implement:

a parser to identify a part of speech associated with an input token received from a user, via a first user input into a user interface;

a mapper to map the input token to at least two query entities comprising a keyword or a database schema attribute based on the part of speech, wherein each query entity of the at least two query entities is associated with an entity type comprising at least database schema attributes; and an application to:

generate a user interface, initiate display, on the user interface, of:

a multi-query entity indicator indicating that the input token has been matched with the at least two query entities, a menu indicating the at least two query entities determined to match with the input token with at least a threshold confidence level, wherein a particular query entity of the at least two query entities is selected in response to a second user input, a first graphical indicator associated with the input token, the first graphical indicator comprising at least a particular color or shade to indicate the determined entity type for the selected query entity of the at least two query entities in response to the second user input, and a textual indication of the determined entity type associated with the selected query entity and with the input token in response to receiving a third user input to cause a movable second graphical indicator to hover over the input token.

16. The system according to claim 15, wherein the entity type comprises one or more of a measure or a dimension.

17. The system according to claim 15, the parser to identify a second part of speech associated with a second input token;

the mapper to map the second input token to a second query entity comprising a keyword or a database schema attribute based on the second part of speech; and the application to generate a second graphical indicator indicating a second entity type of the second query entity, wherein the generated user interface includes the second graphical indicator displayed in association with the second input token.

18. The system according to claim 17, wherein the determined entity type for the selected query entity is a measure and the second entity type is a dimension, further comprising:

a query server to receive a query comprising the selected query entity and the second query entity, and to execute the query to determine a result set; and the application to include a visualization of the result set on the user interface.

19. The system according to claim 15, wherein the selected query entity is not identical to the input token.

20. The system according to claim 15, further comprising:

a query server to receive a query comprising the selected query entity, and to execute the query to determine a result set; and the application to include a visualization of the result set on the user interface.

\* \* \* \* \*